(12) United States Patent
Hoffmann

(10) Patent No.: US 7,958,878 B2  
(45) Date of Patent: Jun. 14, 2011

(54) CAMOUFLAGE AND SUPPORT ASSEMBLY FOR A CROSSBOW

(76) Inventor: Robert R Hoffmann, Franklin, WI (US)

( * ) Notice: Subject to any disclaimer, the term of this patent is extended or adjusted under 35 U.S.C. 154(b) by 497 days.

(21) Appl. No.: 12/122,653

(22) Filed: May 16, 2008

(65) Prior Publication Data

US 2009/0282722 A1 Nov. 19, 2009

(51) Int. Cl.
*F41B 5/00* (2006.01)
(52) U.S. Cl. ............................. 124/25; 124/86
(58) Field of Classification Search ....... 43/1; 124/23.1, 124/86, 88, 25; 135/901; 428/919
See application file for complete search history.

(56) References Cited

U.S. PATENT DOCUMENTS

| 3,179,102 | A | * | 4/1965 | Peckham | 124/23.1 |
| 4,817,579 | A | * | 4/1989 | Mathias | 124/23.1 |
| 5,127,180 | A | | 7/1992 | Norton | |
| 5,235,772 | A | * | 8/1993 | Mendick, Jr. | 43/1 |
| 5,944,041 | A | * | 8/1999 | Kitchens | 135/98 |
| 7,216,644 | B2 | | 5/2007 | Haugen | |
| 7,275,532 | B2 | | 10/2007 | Niemackl | |
| 2002/0124975 | A1 | | 9/2002 | Kendrick | |

* cited by examiner

*Primary Examiner* — John Ricci  
(74) *Attorney, Agent, or Firm* — Steven H. Greenfield; Greenfield Invention and Patent Consulting, Inc.

(57) ABSTRACT

A camouflage and support assembly for a cross bow is disclosed. The assembly is comprised of a camouflage having an opening for shooting the arrow through while the hunter is hidden from view, and a clamp for affixing the crossbow stirrup onto the camouflage. The assembly also comprises a support rod for resting the cross bow. This assembly provides a comfortable stance for the hunter to wait for an animal to appear into view, while also allowing the hunter to move the crossbow along with the camouflage as needed to maintain focus on a potential moving target.

7 Claims, 9 Drawing Sheets

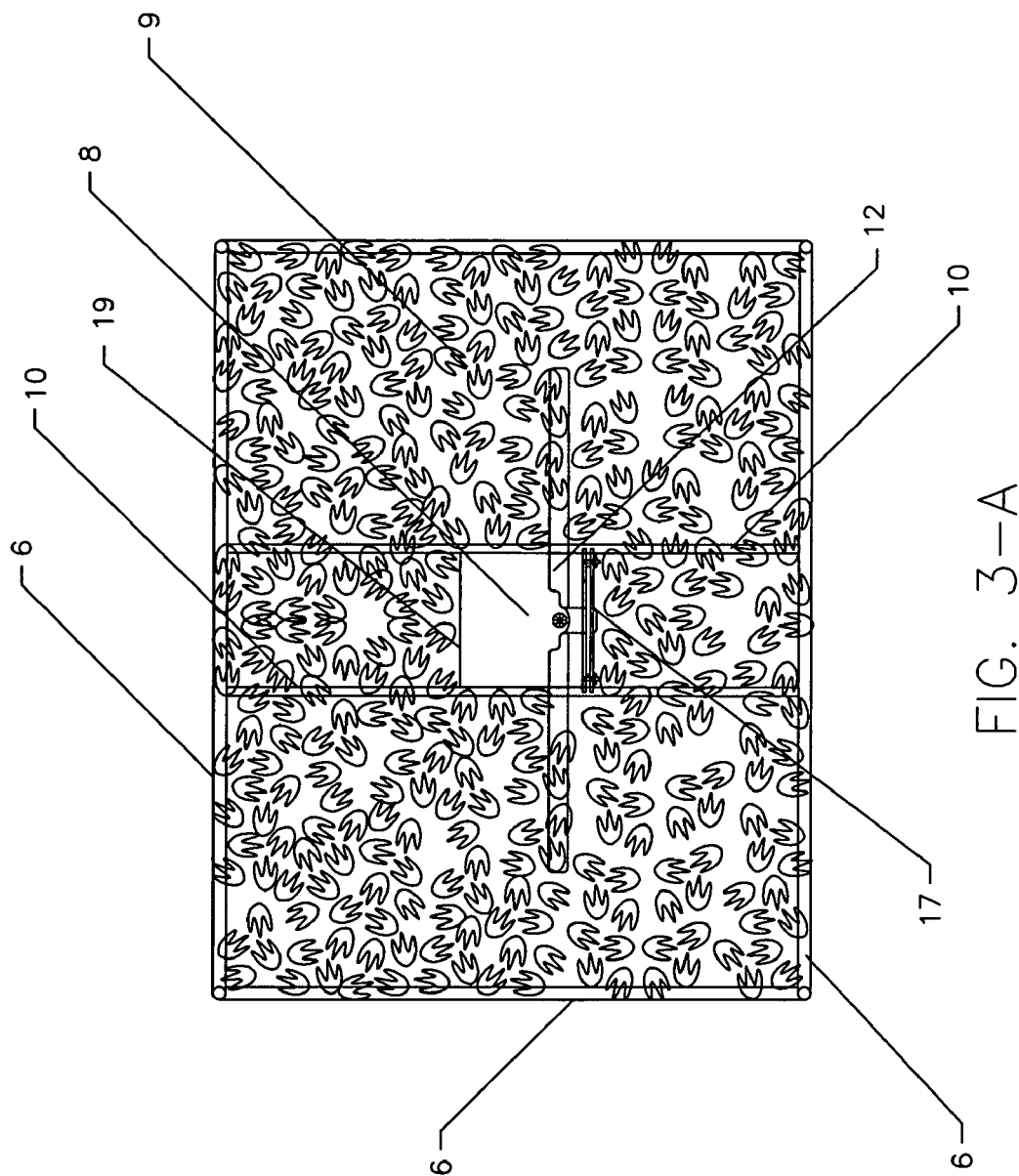

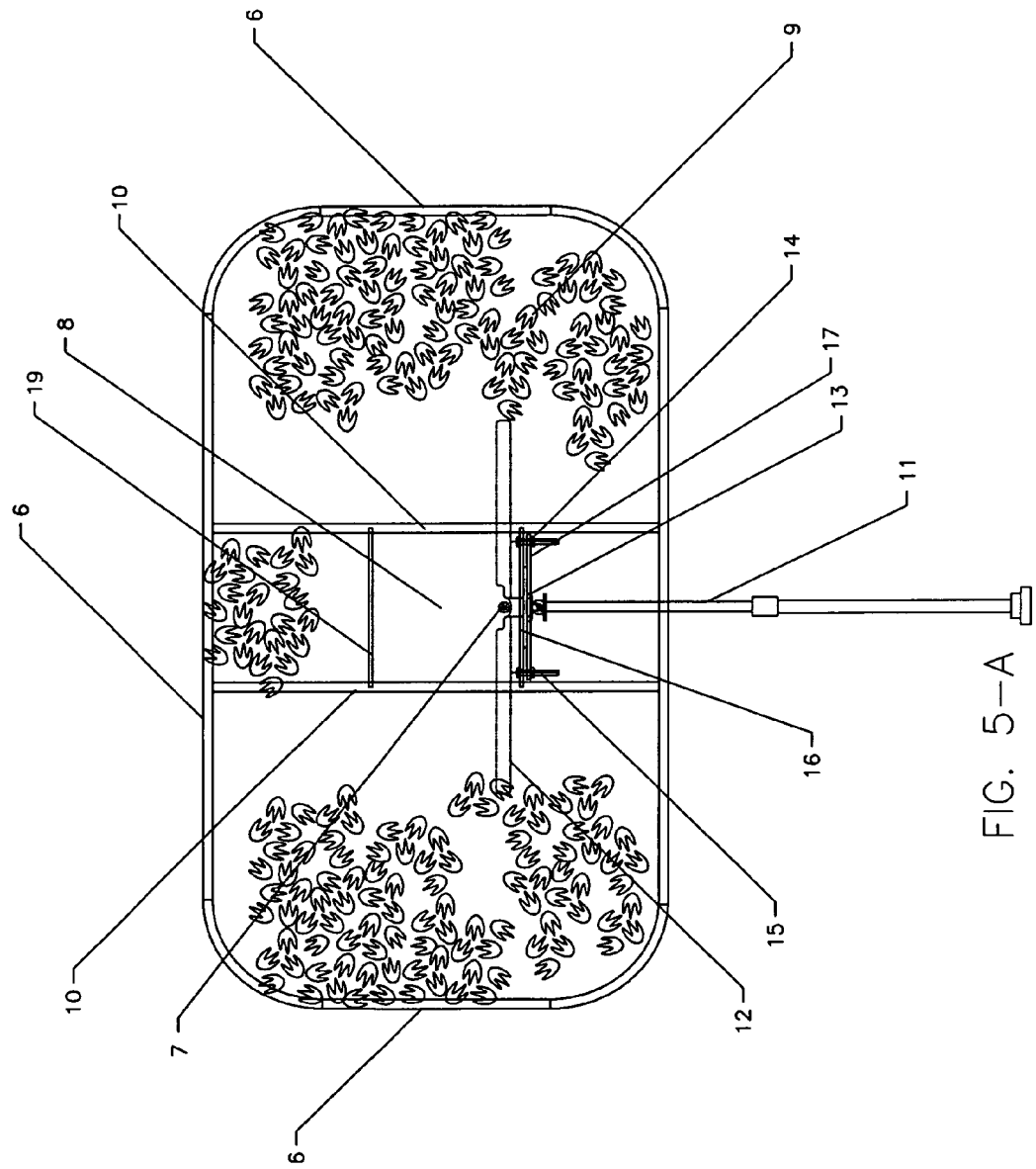
FIG. 5-A

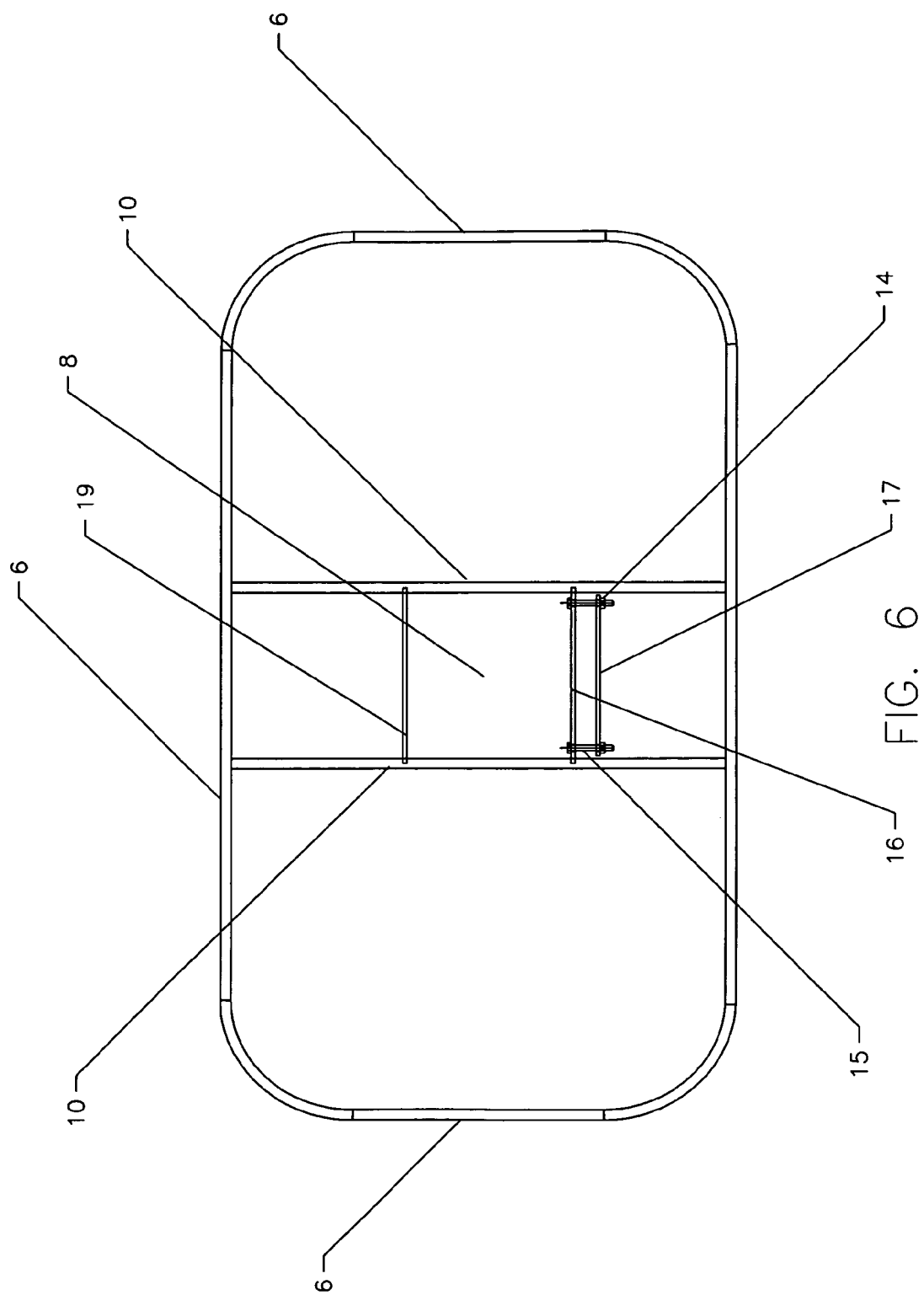

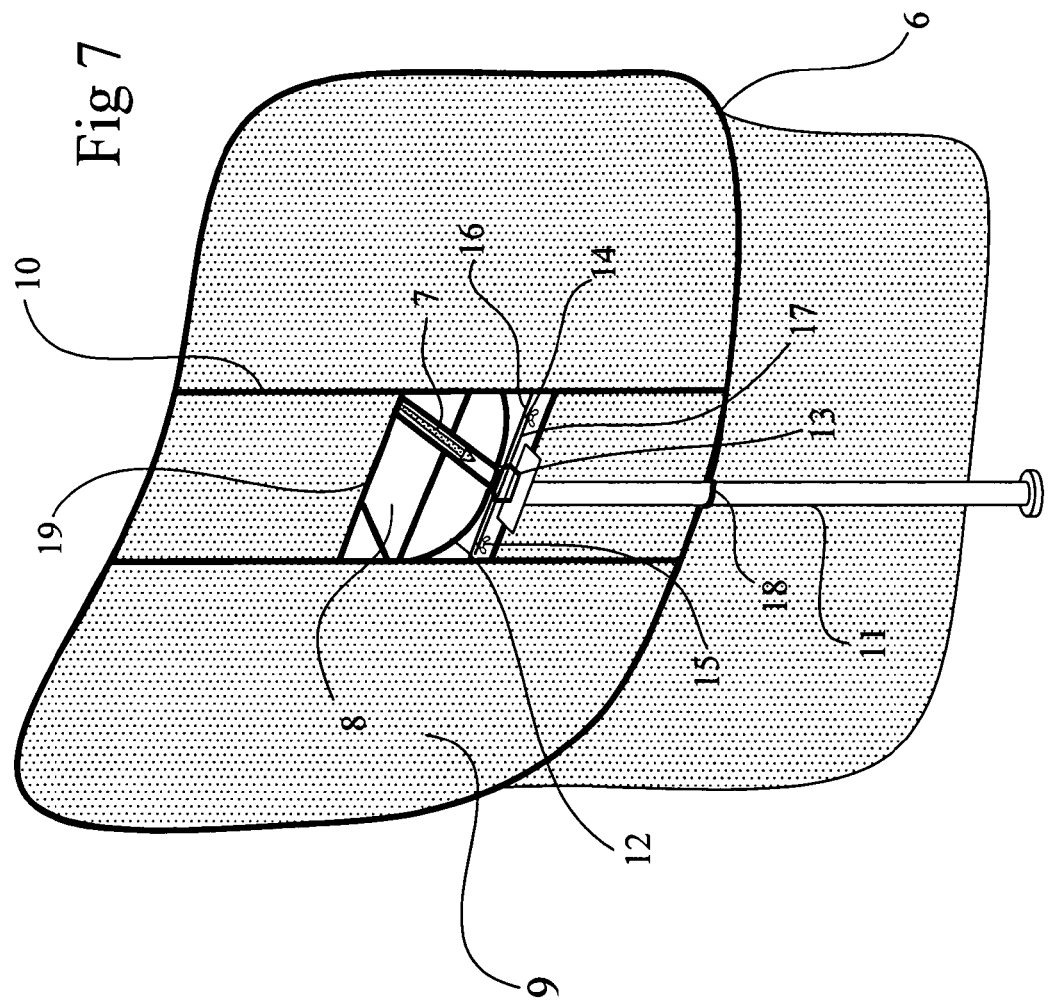

US 7,958,878 B2

CAMOUFLAGE AND SUPPORT ASSEMBLY FOR A CROSSBOW

FIELD OF THE INVENTION

The present invention relates to portable aids for hunters hunting with bow and arrow. More specifically it relates to a camouflage device and a support adapted to a crossbow to facilitate seeing, but not being seen by, the animal and enables an archer to visually track game targets in a comfortable stance.

DESCRIPTION OF THE PRIOR ART

Hunting blinds and camouflages for bows that are held upright and need to be held in a cocked position prior to firing are known in the art. Stands and supports for these types of bows are also known in the art. Pre-grant publication 20030124270 discloses an apparatus that can be mounted to a quiver on a bow provides camouflage and cover for the bow and a shooter. The apparatus is a hollow shaft with a first end having a tapered tip, and a second opposite end. Pre-grant publication number 20020124975 discloses a stealth blind system for providing a lightweight and foldable blind that allows an individual to approach wildlife without being seen. U.S. Pat. No. 6,712,058 teaches an apparatus that can be mounted to a quiver on a bow and provides camouflage and cover for the bow and a shooter. The apparatus is a hollow shaft with a first end having a tapered tip, and a second opposite end. U.S. Pat. No. 5,944,041 describes a portable hunting blind for attachment to an aiming device, such as an archery bow, a firearm, or other hunting device. The portable blind is a camouflage screen supported by a frame of stay rods extending from a central block. U.S. Pat. No. 5,842,495 discloses a portable shelter or camouflage support structure is formed by a plurality of bow formers that are pivoted at opposite bow ends for fan-like development about a substantially common axis or a cluster of parallel axes. U.S. Pat. No. 5,127,180 by Norton is directed to a camouflage device for archery bows includes mounting blocks adapted to being affixed to the bow in spaced relationship. U.S. Pat. No. 4,876,817 by Hill discloses an archery bow-mountable blind which effectively camouflages the movements of the archer, bowstring, and arrow as the bow is being drawn while providing sufficiently clear observation of the target for accurate aiming. U.S. Pat. No. 6,948,694 describes a bow and arrow stand engaging the ground and holding an archery bow in an erect and upright position without contact with the bow string including a vertical support shaft with an angular middle portion. U.S. Pat. No. 6,679,465 teaches a bow rest made of a high-strength, highly durable plastic, such as ABS, is attachable to a tree stand. U.S. Pat. No. 7,216,644 discloses a portable hunting screen. The hunting screen comprises a frame, camouflage material, and an opening through which a weapon can be fired.

The prior art references that were identified relate to bows held in an upright position. Crossbows are different than these types of bows. They are held in a horizontal position prior to firing and are typically equipped with a stirrup, also referred to as a cocking ring, to flex or cock the bow, a mechanism to hold the bowstring in place, and with a trigger to release the arrow. Many contemporary models are also equipped with a "stock", i.e., a handle for a rifle that rests against the shoulder, and a scope. The bows described in the prior art references lack these features. They must therefore be held in a cocked or fully flexed position by hand until the arrow is ready to be released.

BRIEF SUMMARY OF THE PRESENT INVENTION

A camouflage and support assembly for a crossbow are disclosed. The camouflage and support are designed to provide the hunter with a comfortable stance while waiting for the game to appear in his or her eyesight while he or she is undetectable, the flexibility of moving the crossbow to maintain the aim on a moving animal, and the ability to quickly release the arrow when the animal is in the line of fire. While waiting for the animal, the hunter may be sitting on a chair or kneel.

The present invention comprises of a camouflage screen having a rigid outer frame, and a rigid inner frame attached to the outer frame. An opening for viewing the animal without being seen and for shooting an arrow is enclosed within the inner frame. The size of the camouflage screen is designed to conceal most or all of the hunter's body from view. The outer frame is covered with a fabric attached to the outer frame and inner frame but leaves the opening uncovered. The side of the fabric facing the outside is printed with a concealing design. A clamping device for affixing the crossbow stirrup to the camouflage screen is built into the inner frame. The assembly also comprises a support rod for the crossbow stirrup to make the resting stance more comfortable for the hunter. In one embodiment of the present invention, the support rod is permanently welded to the camouflage screen. However, a temporary attachment of the support rod to the camouflage screen is also within the scope of the present invention. Likewise, the support rod may be completely separate from the camouflage screen and set up as needed.

BRIEF DESCRIPTION OF THE DRAWINGS

FIG. 3A is a front view of the outer surface the camouflage depicted in FIG. 3 having right-angle corners.

FIG. 5A shows a front view of the outer surface of a rectangular camouflage screen having round corners.

FIG. 6 portrays a front view of the camouflage frame and clamp of FIG. 5.

FIG. 7 is a perspective front side view of the outer surface of a rectangular camouflage screen having round corners with a plain dotted print showing extra fabric hanging down from the bottom of the camouflage for added concealment.

DETAILED DESCRIPTION OF THE INVENTION

Figure 1:
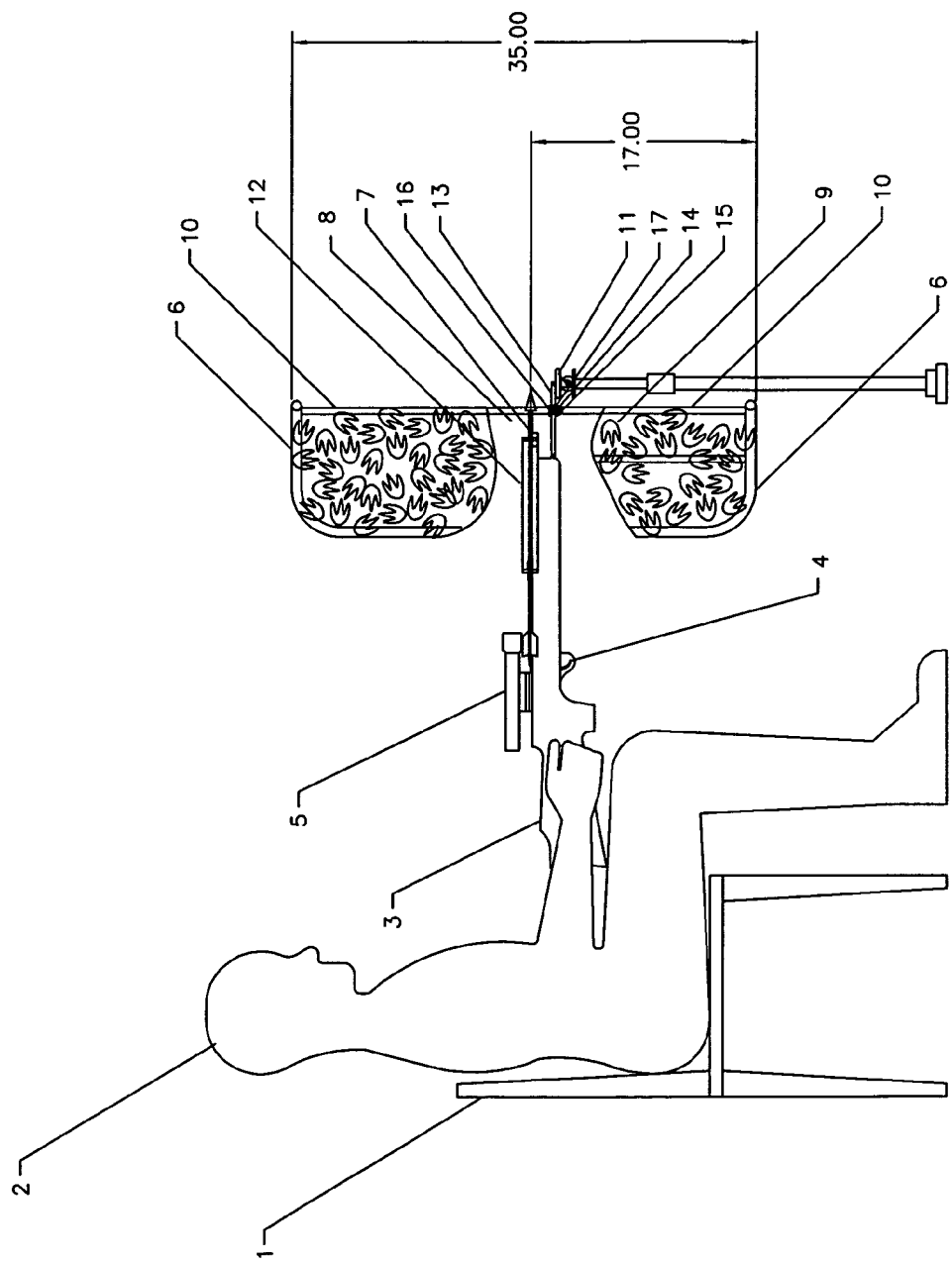
FIG. 1 is a side view of the hunter sitting on a chair behind the camouflage and holding the crossbow supported by a rod.

In the preferred embodiment, the outer frame has a rectangular shape with round corners and comprises of aluminum tubing. However, the outer frame may also be of a rectangular shape having square corners, oval shaped or square shaped. The preferred inner frame design comprises of two parallel vertical aluminum tubes permanently attached to the upper part of the outer frame at one end, and to the bottom part of the outer frame at the other end. It should be understood, however, that the inner and outer frames may be fabricated from other rigid materials such as metal, plastic or wood. The inner frame design may optionally comprise of a plurality of tubes and bars attached to the outer frame for added rigidity. An opening of approximately 8 inches by 8 inches is enclosed within the vertical center of the inner frame by two flat horizontal rigid bars: a top bar that is closest to the top of the outer frame and a bottom bar closest to the bottom of the outer frame. These bars are permanently attached to the vertical aluminum tubes that make up the inner frame. The preferred permanent attachment is achieved by welding the ends of the flat bars to the aluminum tubing. The flat horizontal rigid bars are preferably fabricated from aluminum; however they may be made of other metals, wood or plastic.

The flat horizontal rigid bar closest to the bottom is used for constructing a clamp for fastening the crossbow stirrup to the camouflage screen. The clamp comprises of an upper aluminum bar, which is the flat horizontal rigid bar closest to the bottom of the outer frame, and a lower aluminum bar that slides along two bolts inserted through holes, one drilled into the right side and one drilled into the left side of the upper and lower aluminum bars. The heads of the bolts are supported by the upper clamp bar while the bottom of the bolts emerges through the bottom of the lower bar. The lower bar can slide up and down along the length of the bolts. Two threaded nuts are used for clamping the crossbow stirrup between the lower bar and the upper bar.

The concealing print is applied to the outside of the camouflage, i.e., the side opposite that facing the hunter. The preferred designs represent the environment in which the animals roam such as branches, leaves, or vegetation. However, plain designs such as dots or squares also fit within the context of the present invention. The fabric may be made of any material that can be printed on such as canvas, cloth, cotton, and synthetic materials such as rayon and polyester. The height of the camouflage can range from about 30 inches to about 70 inches and a width ranging from about 30 inches to about 70 inches. The bottom edge of the camouflage may be placed close to the ground or raised as much as 30 inches above ground. The arrow exits through the opening which also provides a field of view for the hunter. Typical size for the opening is approximately 8 inches by 8 inches but can vary from about 4 inches by 4 inches to about 10 inches by 10 inches. The opening is placed approximately in the center of the camouflage fabric, but other placements depending on the size of the camouflage fall within the scope of this invention. To attach the fabric to the frame, the edges of the camouflage fabric are folded to the side facing the hunter, i.e., to the inside, and fastened to the fabric covering the camouflage screen. The fastening may be done by pins, Velcro, tape, strings looped through holes in the frame and fabric, staples, adhesive, clips, or rings looped through holes in the bars. In another embodiment of the present invention, extra fabric is hanging from the bottom of the camouflage for added concealment.

In the preferred embodiment of the present invention, the stirrup of the crossbow protrudes about 1 inch to about 4 inches outside the opening in the camouflage. The camouflage is bent to about a quarter-circle arc shape in front of the part of the bow that flexes when cocked. This part is referred to in the art as the prod or lath. Bending the camouflage in a quarter-circle shape around the bow avoids interference from the camouflage when the arrow is released and the cocked prod springs back to its relaxed position.

Depending on the size of the crossbow, the side to side distance of the unflexed prod can range from about 24 inches to as much as 50 inches. Thus, in order to fully camouflage the hunter in a normal sitting position as well as a leg or arm stretched sideways in either direction, the width of the camouflage fabric may need to be designed for as much as 70 inches. Most typically, however, the width will range from about 30 inches to about 60 inches.

The invention also comprises of a support for the crossbow. The front part of the crossbow stirrup is placed on the support while the hunter is waiting for an animal to appear in his or her view. The preferred embodiment for the support is a rigid rod positioned on the ground just outside the camouflage center and reaching the height of the clamp. The support rod may be made of aluminum or steel tubing, but other rigid materials such as plastic and wood are within the scope of this invention. The top end of the rod is preferably slotted to allow the front part of the cocking ring to fit and rest on it. One example of a slot design for resting the stirrup is a half-pipe. Alternatively, a slotted plate may be attached to the top part of the rod to supplement the support area. The thickness of the rod, which may be circular, rectangular or square, can vary from about 1 inch to about 3 inches. Alternative means for supporting the crossbow include tripods and wooden scaffoldings. The support rod may be made extendable to allow adjusting its height or foldable to facilitate portability. In one version of this invention, the rod is permanently attached to the lower part of the frame by a metal bar wrapped around the rod and welded onto the frame. In another version, the rod attachment is temporary and can be detached with relative ease. Such temporary attachment may utilize plastic ties or tape.

In another embodiment of the present invention, the rigid frame comprises of three sections that may be assembled and disassembled. These are: the right side of the outer frame, the left side of the outer frame and the inner frame. In yet another embodiment, the left and right sides of the outer frame are adapted to be folded from the outside in.

Typical steps the hunter would follow to set up for a hunt are: 1) cocking the crossbow, 2) clamping the crossbow stirrup, 3) placing the cocking ring onto the support rod plate, 4) placing an arrow into the crossbow, and 5) sitting on the chair and waiting for the animal to appear. To set up for the hunt, the hunter would set the height of the support rod such that the top of the camouflage is set from several inches to about one foot below eye level in a sitting position. The hunter would typically be sitting on a chair while holding the crossbow on his lap and watching for the animal from above the top of the camouflage. When an animal is spotted, the hunter would move the crossbow along with the camouflage such that he or she can keep track of the moving animal through the camouflage opening while continuing to maintain concealment. After the arrow is released, the clamps are detached to allow cocking the crossbow again and to set up for the next hunt.

The most common way for a hunter to cock the crossbow is to put his or her foot in the stirrup then reach down and pull the string back manually. This requires over 150 lbs of force, which makes it difficult if not prohibitive for most hunters. With the configuration of the present invention, this method of cocking the crossbow would also require the additional step of disconnecting, then reconnecting the attachments of the crossbow to the camouflage. Physically strong hunters might be able to cock the crossbow by pulling the strings in a sitting position as they press the crossbow stock against their shoulders. Most hunters, however, require an aid such as a rope that uses a simple pulley to cut the required cocking force by a half, or a cranking device such as a winch. These devices would make it easier for the hunter to cock the crossbow while sitting and thus save the step of disconnecting the stirrup from the camouflage.

DETAILED DESCRIPTION OF THE DRAWINGS

FIG. 1 is a side view of the hunter positioned behind the camouflage screen showing the hunter (2) sitting on a chair (1) behind the crossbow stock (3). The crossbow is equipped with a trigger (4) scope (5), a stirrup (13) and an arrow (7). The camouflage outer surface (9) is covered with a printed fabric designed to make it blend in with its surroundings. The top of the camouflage is about 48 inches above ground and is shown bent in a quarter-circle shape around the crossbow lath (12). The bottom of the camouflage is about 13 inches above ground. The camouflage screen comprises an outer frame (6) and an inner frame (10). The inner frame has an opening (8) approximately 8 inches by 8 inches and approximately 30 inches above ground. The opening is vertically centered and it is from where the hunter tracks the movements of the game and from where the arrow exits. The stirrup (13) is supported by a support rod (11) comprising a circular plate at the top of the rod and a base positioned on the ground at the bottom.

Figure 2:
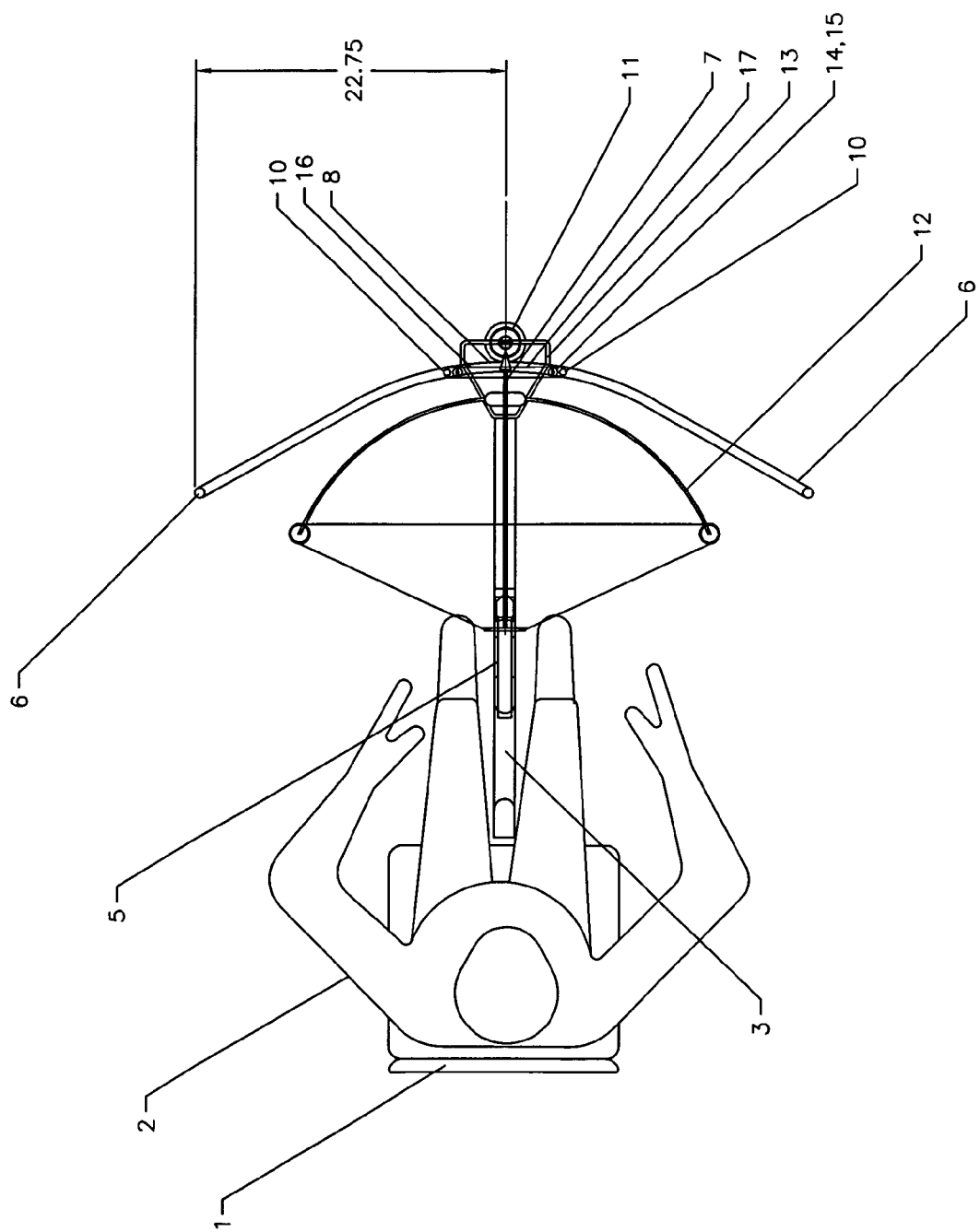
FIG. 2 depicts a top view of the hunter sitting on a chair behind the camouflage and crossbow. The camouflage is shown bent in about a quarter-circle shape in front of the crossbow prod.

FIG. 2 is a top view showing the hunter (2) sitting on a chair (1) behind the crossbow stock (3). The crossbow is equipped with a scope (5). The camouflage screen has an inner frame (10) and an outer frame (6) and is shown in about a quarter-circle configuration around the lath (12). The inner frame (10) has an opening (8) approximately at its vertical center. Protruding outside the opening (8) are the arrow (7) and the stirrup (13) supported by a support rod (11) having a circular support plate at the top and a base at the bottom for positioning the rod on the ground. Also indicated are the clamp lower bar (17), the clamp upper bar (16), the threaded bolt (14) and the fastening nuts (15).

Figure 3:
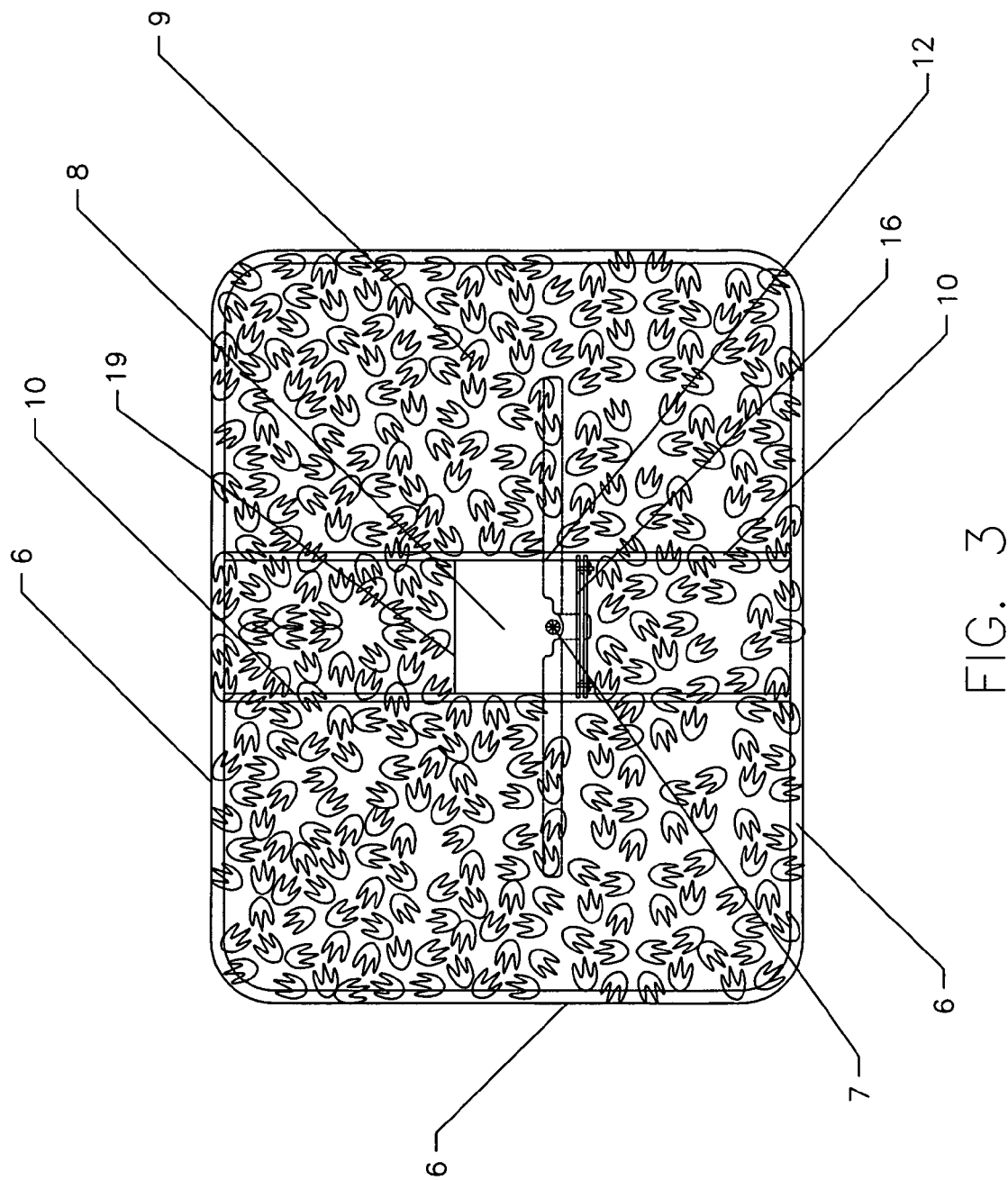
FIG. 3 is an illustration of the front view of the outer surface of a rectangular camouflage screen having round corners.

FIG. 3 is a front view of the outer surface of a rectangular camouflage screen having round corners with the print (9) designed to blend in with the surroundings. It shows the outer frame camouflage with inner frame (10) and outer frame (6). The clamp is shown in a locked position and the clamp upper bar is indicated (16). The opening (8) is located approximately in the center of the camouflage. Behind the opening (8) are the crossbow lath (12) and the arrow (7). The top side of the opening comprising a flat rectangular bar (19) is indicated.

FIG. 3a is a front view of the outer surface the camouflage depicted in FIG. 3 having square corners and indicating the lower clamp bar (17).

Figure 4:
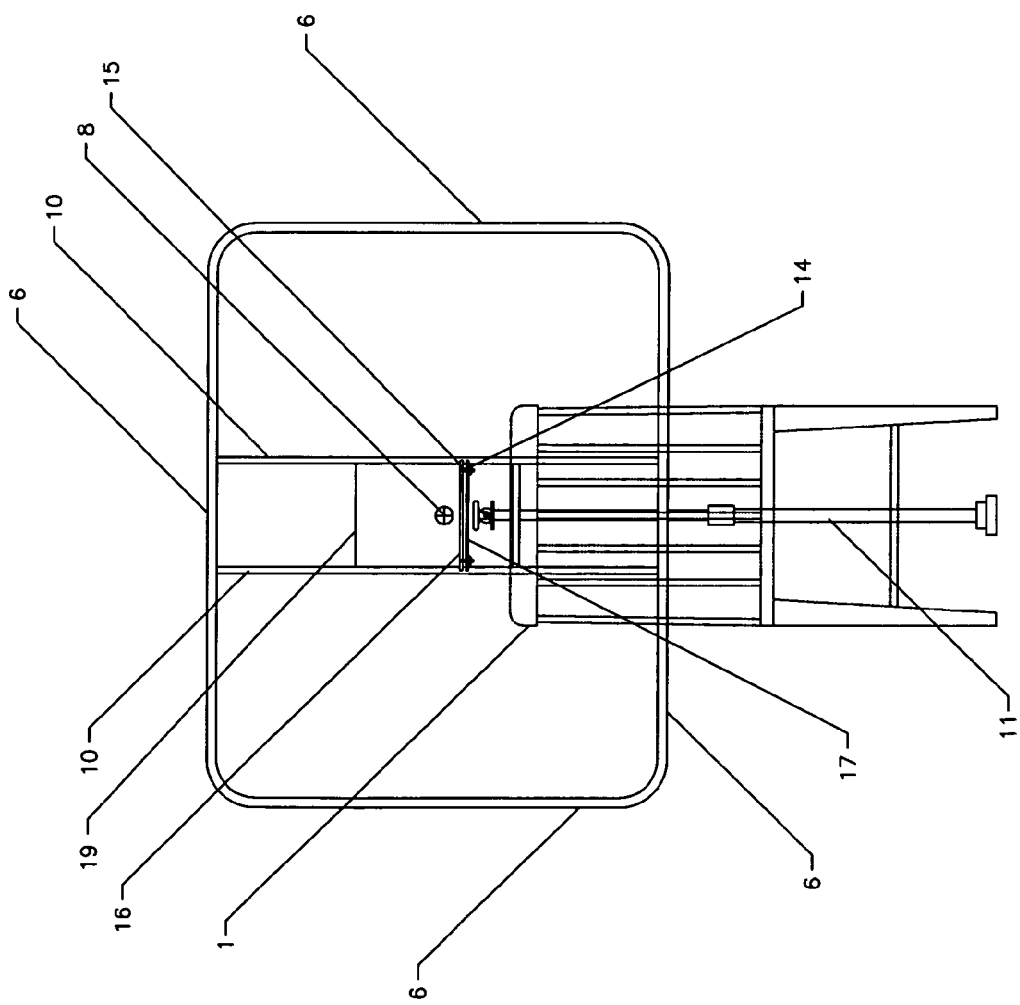
FIG. 4 illustrates a view from the back of the camouflage from the hunter's vantage point showing the chair and the support rod.

FIG. 4 represents the view behind the camouflage frames showing the outer frame (6) and inner frame (10) having opening (8). The chair (1) and support rod (11) are also shown as are the clamp lower bar (17), the clamp upper bar (16), the threaded bolt (14) and one of the fastening nuts (15). The top side of the opening comprising a flat rectangular bar (19) is shown.

Figure 5:
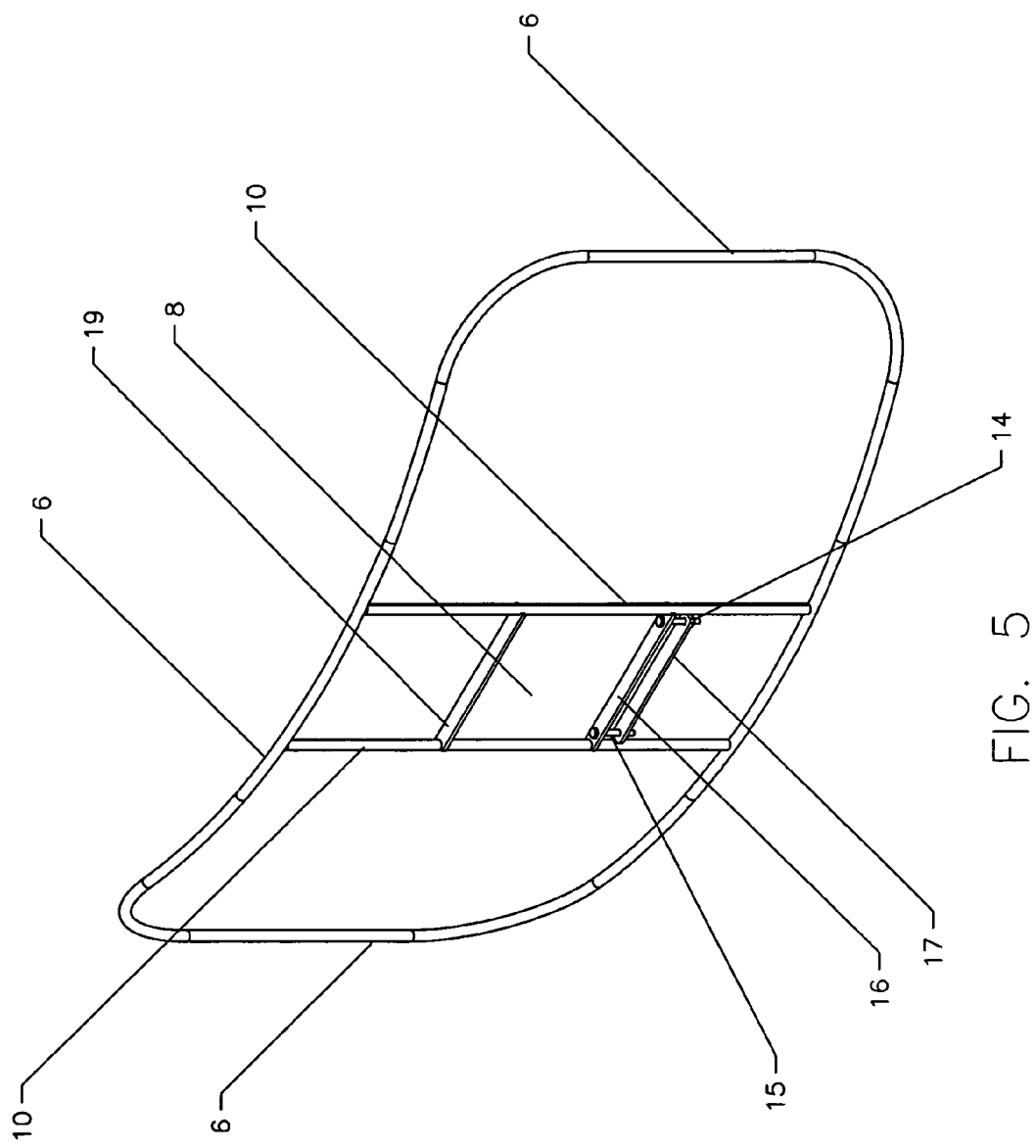
FIG. 5 represents a front side view of a round corner camouflage frame showing the outer frame and the inner frame.

FIG. 5 is a front side view of a round corner camouflage frame showing the outer frame (6) and the inner frame (10) having an opening (8). Shown are the clamp lower bar (17), the clamp upper bar (16), the threaded bolt (14) and one of the fastening nuts (15). This view highlights the backward arching shape of the frame. The top side of the opening comprising a flat rectangular bar (19) is indicated.

FIG. 5a is a front view of the outer surface of a rectangular camouflage screen having round corners with the print (9) designed to blend in with the surroundings. It shows the outer frame camouflage with the inner frame (10) and the outer frame (6). The clamp is shown in a locked position onto the stirrup (13) indicating the upper bar (16) and lower bar (17). The opening (8) is located approximately in the center of the camouflage. Behind the opening (8) are the crossbow lath (12) and the arrow (7). Also shown are the threaded bolt (14) and the fastening nuts (15). The stirrup (13) rests on the support rod (11). The top side of the opening comprising the flat rectangular bar (19) is shown.

FIG. 6 is a front view of the round corner camouflage frame and clamp of FIG. 5. The top side of the opening comprising the flat rectangular bar (19) is specified.

FIG. 7 is a front side view of the outer surface of a rectangular camouflage screen having round corners with a plain dotted print (9). It shows the camouflage screen comprising of the inner frame (10) and the outer frame (6). The clamp is shown locked on the stirrup (13) indicating the upper bar (16) and lower bar (17). The opening (8) is located approximately in the center of the camouflage. Behind the opening (8) are the crossbow lath (12) and the arrow (7). Also shown are the threaded bolt (14) and one of the fastening nuts (15). The stirrup (13) rests on the support rod (11) having a flat plate situated on the top of the rod. In this configuration, the support rod is attached to the camouflage screen by a rigid bar (18). Extra fabric is hanging from the bottom of the camouflage for added concealment. The top side of the opening comprising the flat rectangular bar (19) is indicated.

I claim:

1. A camouflage and support assembly for a crossbow containing a lath, a stock, a stirrup and a string, comprising:
   a. a camouflage screen having an outside and an inside, said camouflage screen comprising a rigid outer frame, said camouflage screen outer frame being substantially rectangular having a top side, a bottom side, a right side relative to facing the outside of the screen, a left side in relation to facing the outside of the screen, and four corners; a rigid inner frame, said inner frame comprising a plurality of rigid bars permanently attached to the outer frame, said inner frame comprising two substantially parallel rigid tubular bars, said bars including a right side rigid tubular bar and a left side rigid tubular bar, said right side tubular bar and the left side tubular bar being substantially parallel to the left side and to the right side of the camouflage screen outer frame; a clamping device for fastening the camouflage screen to the stirrup of the crossbow; an opening for shooting an arrow enclosed within said inner frame, said screen opening being substantially rectangular having a top side and a bottom side, having a right side and a left side, said top side of the opening comprising a flat rectangular bar, said bottom side comprising the clamping device, said right side of the opening comprising a portion of the right side rigid tubular bar of said inner frame, and the left side of the opening comprising a portion of the left side rigid tubular bar of said inner frame; and a material attached to the camouflage screen, said material covering the outer frame and the inner frame in a manner that leaves the opening uncovered; and
   b. a support rod for the crossbow stirrup.

2. The camouflage and support assembly of claim 1, wherein the top and bottom sides of the camouflage screen outer frame are bowed from the outside of the camouflage screen to the inside of the camouflage screen in the shape of an arc.

3. The camouflage and support assembly of claim 1, wherein the clamping device comprises:

A. an upper flat rectangular bar having a left side and a right side, having a top and a bottom, said right side of said flat rectangular bar being permanently attached to the right side of the rigid tubular bar of the inner frame, said left side of said flat rectangular bar being permanently attached to the left side of the rigid tubular bar of the inner frame, said upper rectangular bar being substantially parallel with the flat rectangular bar at the top side of said opening;

B. a first threaded bolt having a head and a bottom, said first threaded bolt being inserted into the upper rectangular bar through a hole drilled into the right side of the upper flat rectangular bar, said head of said first threaded bolt being rested on top of the upper flat rectangular bar;

C. a second threaded bolt having a head and a bottom, said second bolt being inserted into said upper flat rectangular bar through a hole drilled into the left side of said upper flat rectangular bar, said head of the second threaded bolt being rested on top of the flat upper rectangular bar;

D. a lower flat rectangular bar positioned below the upper flat rectangular bar, said lower flat rectangular bar having a left side and a right side, a top side and a bottom side, said lower flat rectangular bar being substantially parallel with the upper flat rectangular bar, said first threaded bolt being inserted into said lower rectangular bar through a hole drilled into the right side of said lower rectangular bar, and said second threaded bolt being inserted into said lower rectangular bar through a hole drilled into the left side of said lower rectangular bar, said lower flat rectangular bar being adapted to slide up and down along the first threaded bolt and the second threaded bolt;

E. a first threaded nut adapted to thread onto the bottom of said first threaded bolt; and F. a second threaded nut adapted to thread onto the bottom of said second threaded bolt.

4. The camouflage and support assembly of claim 1, wherein the support rod is positioned at the outside of the camouflage screen, said support rod has a top side and a bottom side, said top side is fitted with a plate sufficiently wide to support the crossbow stirrup, and said bottom side is fitted with a base for vertically positioning on the ground.

5. The camouflage and support assembly of claim 4, wherein the bottom side of said support rod comprises a tripod.

6. The camouflage and support assembly of claim 4, further comprising a rigid bar having two ends, said bar being permanently attached to said support rod at one end, said attachment point being below the plate fitted on the top side of the support rod and permanently attached to the bottom part of the outer frame at the other end.

7. The camouflage and support assembly of claim 4, wherein the support rod is adapted for folding onto the camouflage.

\* \* \* \* \*